(12) United States Patent
Fliess et al.

(10) Patent No.: US 7,392,197 B1
(45) Date of Patent: Jun. 24, 2008

(54) SYSTEMS AND METHODS TO ENABLE COLLABORATIVE HUMAN CAPITAL MANAGEMENT

(75) Inventors: Kevin Fliess, Mountain View, CA (US); Goetz Weber, Mountain View, CA (US)

(73) Assignee: SAP AG, Walldorf (DE)

( * ) Notice: Subject to any disclaimer, the term of this patent is extended or adjusted under 35 U.S.C. 154(b) by 1172 days.

(21) Appl. No.: 10/160,252

(22) Filed: Jun. 4, 2002

Related U.S. Application Data

(60) Provisional application No. 60/297,842, filed on Jun. 12, 2001.

(51) Int. Cl.
*G06Q 99/00* (2006.01)
(52) U.S. Cl. ............................................ 705/1
(58) Field of Classification Search ................. 705/1
See application file for complete search history.

(56) References Cited

U.S. PATENT DOCUMENTS

| | | | | |
|---|---|---|---|---|
| 5,111,391 | A | 5/1992 | Fields et al. ............... | 364/401 |
| 5,164,897 | A * | 11/1992 | Clark et al. .................. | 705/1 |
| 5,872,924 | A | 2/1999 | Nakayama et al. ..... | 395/200.35 |
| 5,974,395 | A | 10/1999 | Bellini et al. ................ | 705/9 |
| 6,115,709 | A | 9/2000 | Gilmour et al. .............. | 707/9 |
| 6,119,149 | A | 9/2000 | Notani ....................... | 709/205 |
| 6,154,783 | A | 11/2000 | Gilmour et al. ............ | 709/245 |
| 6,157,915 | A | 12/2000 | Bhaskaran et al. .......... | 705/7 |
| 6,675,151 | B1 * | 1/2004 | Thompson et al. .......... | 705/9 |
| 2002/0010614 | A1 * | 1/2002 | Arrowood ................... | 705/9 |
| 2004/0260601 | A1 * | 12/2004 | Brief ........................ | 705/11 |
| 2005/0114195 | A1 * | 5/2005 | Bernasconi .................. | 705/9 |

OTHER PUBLICATIONS

Tacit Knowledge Systems (www.tacit.com, visited Mar. 20, 2001), 13 pages.

* cited by examiner

*Primary Examiner*—Jonathan Ouellette
(74) *Attorney, Agent, or Firm*—Finnegan, Henderson, Farabow, Garrett and Dunner LLP (57) ABSTRACT

Systems and methods consistent with the instant invention may allow organizations to instantiate and participate in a collaborative network (i.e., a consortium) through which they can exchange intellectual capital. A governance may be established for regulating the collaborative network. In addition, a communications portal may be provided through which the organizations can exchange skills, competencies, and resources. Organizations may be able to publish, via the portal, their respective supply of and demand for intellectual capital. Organizations may be able search for and utilize employees of other organizations, collaboratively hire new employees, and collaboratively hire former employees.

26 Claims, 9 Drawing Sheets

SYSTEMS AND METHODS TO ENABLE COLLABORATIVE HUMAN CAPITAL MANAGEMENT

CROSS REFERENCE TO RELATED APPLICATION

This application claims the benefit of U.S. Provisional Patent Application No. 60/297,842, filed Jun. 12, 2001, the disclosure of which is expressly incorporated herein by reference in its entirety.

BACKGROUND OF THE INVENTION

1. Field of the Invention

The present invention generally relates to data communications systems, and more particularly to systems and methods for allowing businesses to exchange intellectual capital. In one example, a plurality of companies may establish and participate in a collaborative network, which enables them to identify, access, and disseminate information regarding human assets.

2. Description of the Related Art

An accepted measure of business performance is shareholder value. A primary determinant of this value is a company's ability to optimize its use of tangible and intangible assets. Often, a great deal of focus and effort is placed on increasing the productivity of tangible assets. These efforts typically include streamlining current business processes to accrue greater efficiencies and reduce redundancies.

However, the true potential for growth of shareholder value lies not in further focus on the tangible assets, but in the successful management and employment of intangible assets. Intangible assets, or intellectual capital, may include experience, resources, people (human capital), etc. Intangible assets may provide the basis for organizational renewal and sustainable competitive advantage.

Currently, the corporate landscape is in a state of flux. A "New Economy" is emerging, bringing about increased global activity marked by sustained deflationary pressures and continuous innovation. Technology and tangible assets enable this global activity. However, a firm's intangible assets are the key production factor for innovation and success. A firm's failure to leverage these intangible assets may result in declining performance of many well-established firms. In the new economy, the ability to generate increasing economic returns from managed competencies will be essential to a firm's ability to sustain and increase its value.

To cope with these pressures, firms are typically investing in three discrete areas. Human Capital Management ("HCM") for people, Alliance Management ("AM") for partners, and Knowledge Management ("KM") for information. These functional areas are usually autonomous units having different objectives and goals. Generally, HCM is tasked with employee recruiting, development, and retention. Alliance Management involves the establishment and cultivation of relationships with business partners, while KM focuses on extracting enterprise information and sharing it within the organization. Although these areas are viewed as independent entities, they are bound by a common thread: the focus on intangible assets. Accordingly, it may be beneficial to bring the core tenets of HCM, AM, and KM together.

Further, given the importance of intangible assets and the difficulty of maintaining self-sufficiency in an environment that demands strategic focus, flexibility, and innovation, it may be beneficial to enable a group of alliance firms to manage and share intellectual capital, especially human capital. That is, increased value may be achieved by enabling a group of organizations to exchange their employees' intellectual capabilities. Enabling firms to effectively leverage and exchange skills, competencies, and resources with alliances may generate enhanced economic returns resulting in increased value.

SUMMARY

The instant invention is directed to methods and systems that may obviate one or more of the above and/or other problems by allowing firms to effectively leverage their intellectual capital. Systems and methods consistent with principles of the instant invention may provide business alliances with the ability to instantiate and participate in a collaborative network through which they can exchange skills, competencies, and resources. The instant invention may allow enterprises to realize enhanced economic returns and increased value.

One aspect of the present invention involves establishing a consortium of organizations. In one implementation, the consortium may comprise a plurality of individual organizations in alliance. The consortium, however, may also comprise one or more departments, or intra-organizational units, within a single organization. Moreover, the instant invention may involve establishing a plurality of consortiums. In one embodiment, an organization could be a member of more than one consortium.

Another aspect of the instant invention may involve establishing a governance for the consortium. That is, there may be methods provided for defining rules, processes, objectives, and procedures for a given consortium.

One aspect of the instant invention involves providing a communications interface through which the consortium members can interact. In one embodiment, the interface may include one or more portals for enabling the consortium to exchange skills, capabilities, knowledge, and resources. In exemplary configurations, portals may include websites providing internet, extranet, and/or intranet access.

In one embodiment, the present invention may facilitate the collaborative exchange of employees. Consistent with principles of the invention, one or more members of the consortium may publish information associated with their supply of employees. For example, information regarding employees who are currently idle and therefore available to work on projects may be published. In addition, one or more members of the consortium may publish information associated with their demand for such employees. For instance, current projects (or vacancies) that need staffing could be published. In one configuration, consortium member may publish their respective supply and demand information via the portal.

One aspect of the instant invention may involve allowing one or more members to access, via the portal, information associated with other members' employees (supply). In addition, a consortium member may be able to find available employees from other consortium members to work on projects based on a search criteria. In exemplary embodiments, searching, matching and/or other techniques may be employed to correlate available employees with vacancies. Consistent with principles of the instant invention, a consortium member (sourcing) may utilize an employee from another member (parent), while that employee remains employed by the parent organization.

Another aspect of the instant invention involves facilitating the collaborative hiring of new employees. In one embodiment, a hiring portal may be provided, which is accessible by the public or a subset of the public. On or more members of the consortium may publish, via the hiring portal, information associated with open positions in their organizations. Prospective applicants may be able to register to view and apply for these available positions via the portal. Consistent with principles of the instant invention, one or more consortium members may receive an application for employment and may refer the applicant to other consortium members.

An additional aspect of the present invention involves facilitating the collaborative re-hiring of alumni. In one embodiment, former employees, or alumni, may be able to access the communications interface and apply to one or more members of the consortium. Given their previous employment status, the alumni may be given greater access to information published by consortium members.

A further aspect of the invention may involve using product or service lifecycles to forecast or manage the exchange of human capital. For example, consortium members may be able to publish predictions relating to future supply and demand based on the lifecycle of a particular product or service. For instance, a software company could have a product in the development stage and may publish, via the communications interface, a forecasted need for employees with experience in product deployment.

The present invention may allow networked companies to create value by enhancing the innovative capacity of the participating firms; increasing employee satisfaction, development, and retention; and strengthening business alliances by bolstering partner trust and enabling partners to identify the optimal project resources. Thus, by enabling the exchange of intellectual capital, the instant invention may significantly increase the ability of an enterprise to out-perform its competitors.

Additional aspects related to the invention will be set forth in part in the description which follows, and in part will be obvious from the description, or may be learned by practice of the invention. Aspects of the invention may be realized and attained by means of the elements and combinations particularly pointed out in the appended claims.

It is to be understood that both the foregoing and the following descriptions are exemplary and explanatory only and are not intended to limit the claimed invention in any manner whatsoever.

BRIEF DESCRIPTION OF THE DRAWINGS

The accompanying drawings, which are incorporated in and constitute a part of this specification exemplify certain aspects of the present invention and, together with the description, serve to explain some of the principles associated with the invention.

FIG. 3b is a flowchart graphically depicting steps of a method consistent with the implementation depicted in FIG. 3a.

DETAILED DESCRIPTION

In the following detailed description reference will be made to the accompanying drawings, in which like numerals represent like elements throughout the figures. The accompanying figures illustrate exemplary embodiments of the present invention, which are described in sufficient detail to enable those skilled in the art to practice the invention. It is to be understood that other implementations may be utilized and that structural and method changes may be made without departing from the scope of present invention. The following discussion is, therefore, not to be construed in a limiting sense.

Figure 1:
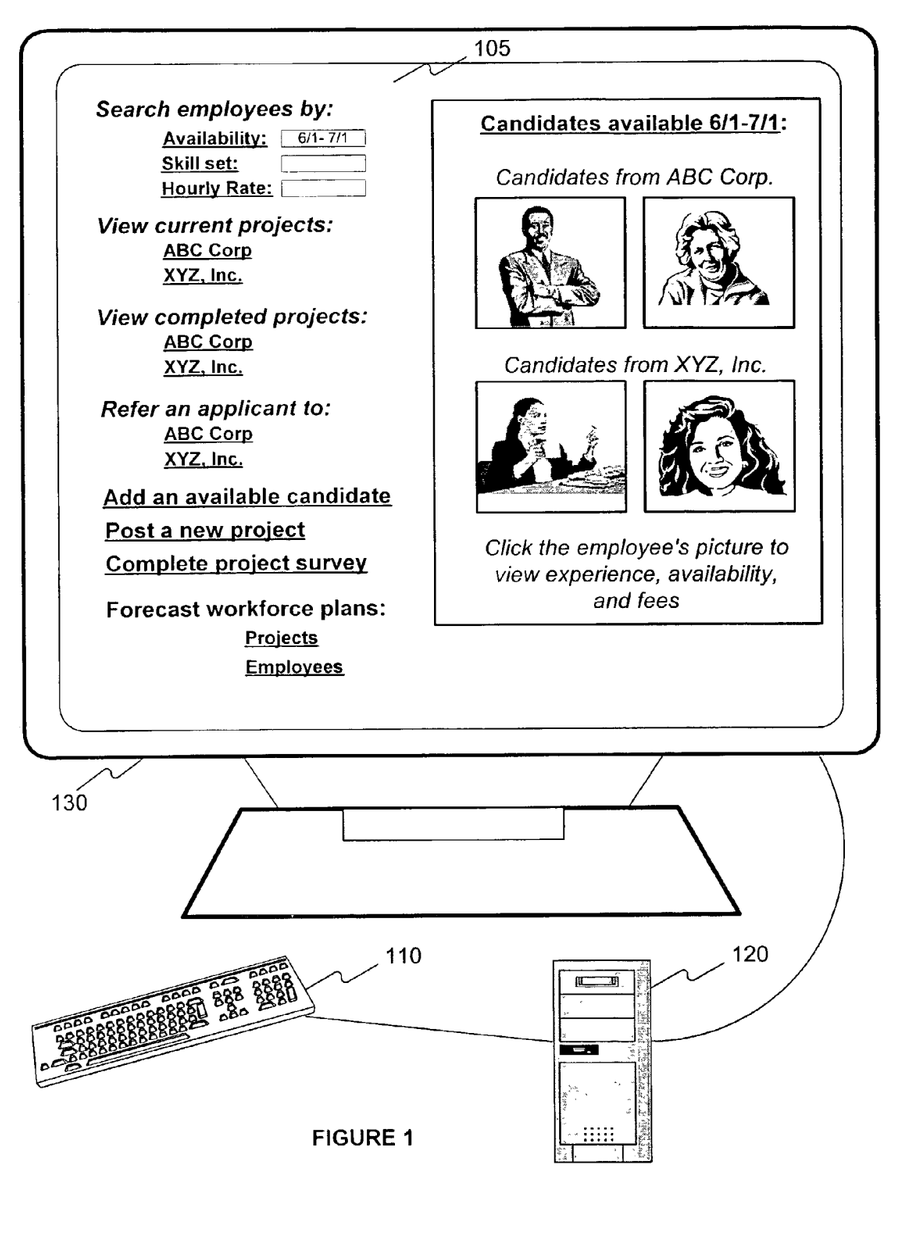
FIG. 1 is a graphical depiction of one exemplary implementation of a communications interface consistent with the present invention.

Consistent with exemplary embodiments of the present invention, methods may be provided for enabling two or more organizations to exchange intellectual capital. One embodiment of the present invention is illustrated, by way of example, in the screen shot of FIG. 1. As illustrated in FIG. 1, the present invention may involve providing a portal (e.g., website 105) through which each organization can publish and acquire information associated with the collective supply of and demand for intellectual capital. For purposes of explanation, three organizations (Ace Co., ABC Corp, and XYZ, Inc.) are used in FIG. 1. In the illustrated embodiment, the portal may be configured to provide extranet access to these organizations. As illustrated, Ace Co. may be able to search available employees published by ABC Corp, and XYZ, Inc. (supply) to work on a project (demand) via the portal. For example, employees may be searched by their availability. In one configuration searching and/or matching processes may be employed to perform searches. Upon initiating a search, a list of available employees may be presented from which Ace Co. may choose. In addition, Ace Co. may be able to post upcoming or forecasted projects (demand) and its available employees (supply). Ace Co, may also be able to refer new applicants or previous employees to either ABC Corp, and XYZ, Inc. In exemplary implementations, upon completion of a project, Ace Co. may be able to complete a satisfaction survey regarding the performance of a particular employee. In one configuration, the completed survey may be used in the matching process in subsequent searches. For example, if Ace Co. had a particularly positive experience with a certain employee from ABC Corp., that employee might be given greater weight in a subsequent search made by Ace Co.

The foregoing discussion is intended to introduce and provide initial clarity for some of the aspects associated with the present invention by referring to the exemplary embodiment depicted in FIG. 1. Further details of this embodiment as well as additional aspects and embodiments of the present invention will be described in the following discussion.

Figure 2:
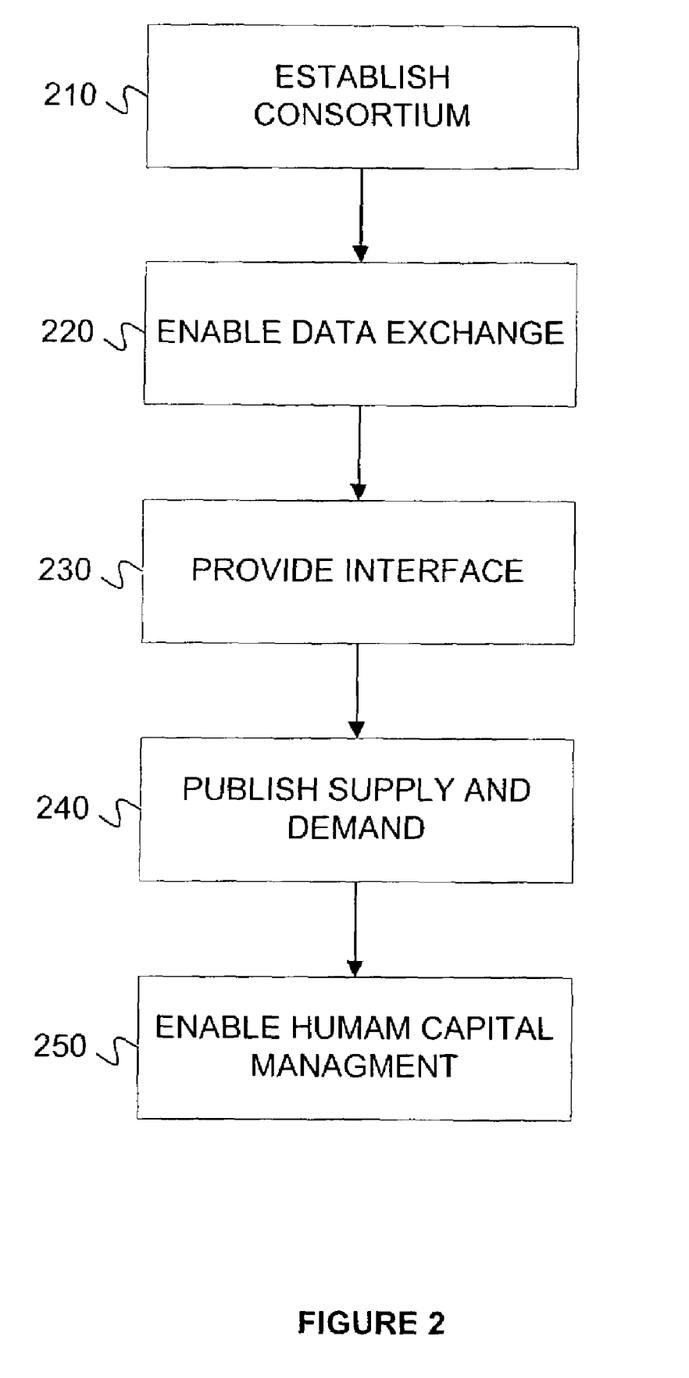
FIG. 2 is a flowchart consistent with methods of the present invention.

As indicated by step 210 in the flowchart of FIG. 2, a method consistent with the present invention may include establishing a consortium. As used herein, the term "consortium" refers to any association or combination of organizations. Organizations may include, but are not limited to, corporations, partnerships, firms, enterprises, service providers, manufacturers, suppliers, distributors, wholesalers, retailers, educational institutions, and government agencies. A consortium may comprise any number of organizations. In addition, a consortium may comprise any number of subdivisions or departments within one or more organizations. For example, a single corporation may have several independent business areas, or "intra-organizational units," which form (or are included in) a consortium. In an exemplary embodiment, the consortium may be formed among business alliances. That is, the consortium may be formed among organizations sharing a common objective or goal.

Consistent with principles of the present invention, an organization may be a member of a plurality of consortiums. For example, a single firm could be a member of several independent consortiums while also having an intra-organizational consortium. Additionally or alternatively, each intra-organizational unit within a firm could be included in one or more consortiums.

Moreover, it should be understood that a consortium may be scalable. That is, organizations or intra-organizational units could be added and/or removed at any time.

Establishing a consortium may further involve identifying objectives and establishing a consortium governance. As used herein, the term "consortium governance" refers to rules, procedures, and processes for the consortium. The governance may define rules of engagement and boundaries for information exchange. For example, there may be rules defined for regulating personal conduct; the exchange of confidential information; inter-organizational competition; disputes; and remedies for noncompliance.

Consistent with principles of the present invention, methods may be provided for enabling data exchange within a given consortium, as indicated in step 220 of FIG. 2. In one embodiment, this may involve establishing an underlying infrastructure for communicating information. For example, each member of a given consortium may be interconnected via, or included in, a communications network, enabling private data exchange between consortium members. The communications network may provide the underlying infrastructure for information exchange between consortium members. Additional details of such a network will be explained below in connection with FIG. 6.

As illustrated in step 230 of FIG. 2, a method of the present invention may include providing an interface through which members of a given consortium can interact and access information. In one configuration, this step may involve creating a communications portal. As used herein, the term "portal" refers to a gateway through which consortium members can identify, access, and acquire information. In one implementation, the communications portal could be implemented via one or more websites maintained by one or more consortium members. The portal may provide features including, but not limited to, data access and searching, categorization, personalization options, data profiling, and application integration.

Consistent with principles of the instant invention, the portal could be configured to provide varying levels of accessibility, depending on the consortium configuration. Thus, the portal could be configured as an intranet website, accessible by intra-organizational units; an extranet website, providing inter-organizational access; or an internet website, accessible by all or a portion of the general public. In addition, the portal may include a combination of intranet, extranet, and internet websites. For instance, certain portions of the portal may be restricted to consortium members (intranet or extranet), while other portions may be accessible to the public (internet). An exemplary implementation of a communications portal is illustrated in FIG. 1 (website 105) and will be described in connection with FIG. 7.

Consistent with principles of the instant invention a consortium member may restrict portal access to a subset of its workforce (e.g., senior partners). Thus, methods may be provided for performing user authentication and authorization. In one implementation, user authentication may be performed via logon passwords. For example, a user may register, or be registered by the consortium, using an assigned or self-declared password. However, other mechanisms for performing user authentication may be employed such as a public key infrastructure (PKI) employing public key cryptography.

Upon successful authentication, a user may be authorized to access information via the portal. In one embodiment, different users may be provided varying levels of authorization. For instance, certain users may be restricted from accessing particular information. Further, certain users may be able to access, publish, and modify information, while others may be restricted to viewing the information. In addition, members of a given consortium may not be authorized to modify other consortium members' published information. The levels of authorization for users may be established in the consortium governance.

In accordance with principles of the instant invention, methods may be provided for allowing consortium members to publish their supply of and demand for intellectual capital. This is graphically depicted by step 240 of FIG. 2. As used herein, the term "intellectual capital" refers to assets or resources relating to intellectual capabilities. Intellectual capital may include "human capital," which is a form of capital based on the intellectual capabilities of employees.

Consortium members may be able to publish information associated with their respective demands for intellectual capital via the portal. For example, an organization may publish its current projects which need staffing and/or current job openings. Demand information could also be information requests. For example, an organization could post requests for information regarding specific topics which other members might have more experience with.

Consortium members may additionally or alternatively publish information regarding their supply of intellectual capital via the portal. For example, one or more organizations in a consortium may publish their supply of employees. In addition, information associated with each employee including, but not limited to, background, professional experience, expertise, hourly wages, available work dates may be made available to consortium members. If the portal is an internet website, an applicant from the general public (outside the consortium) may be able to access the portal and apply for a posted job opening. In this fashion, supply information may be obtained from the public domain. In addition, supply information could also be published from consortium member employees that have limited access to the portal. For example, a firm may allow its associates to refer prospective applicants via the portal, while restricting them from further access. Moreover, a members supply of intellectual capital could be pure knowledge or experience in a certain business or technical area.

In one implementation, the supply of and demand for intellectual capital may be maintained in databases coupled to the portal. Further details of such a database will be described in connection with FIG. 7.

Upon publishing their supply of and demand for intellectual capital, the consortium members may be enabled, via methods of the instant invention, to manage their intellectual capital. This is indicated by step 250 if FIG. 2. Consistent with principles of the instant invention, human capital management may include, but is not limited to, "collaborative employee deployment," "collaborative employee hiring," and "collaborative employee rehiring."

Figure 3A:
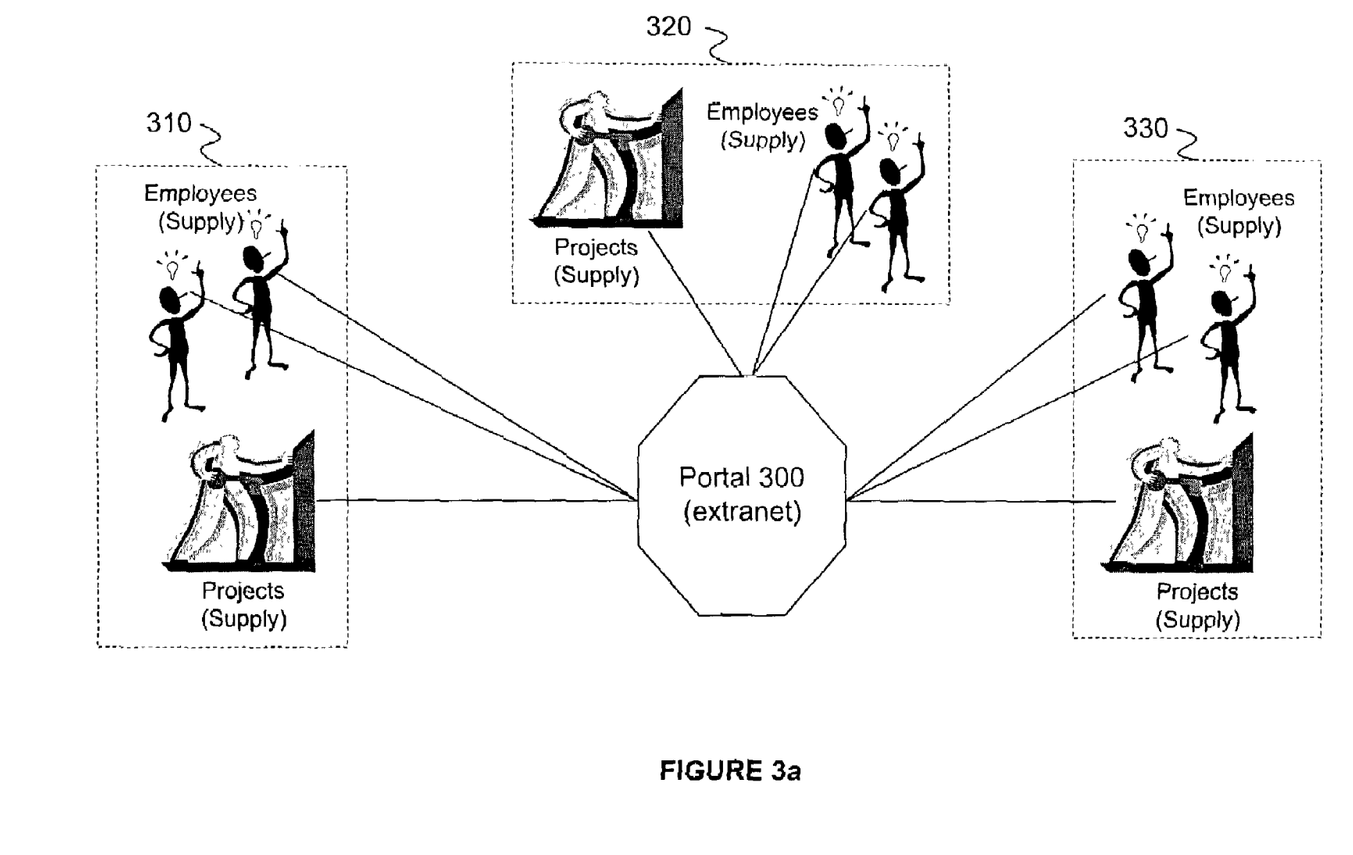
FIG. 3a is an exemplary block diagram depicting one implementation of the present invention.

"Collaborative employee deployment," which is graphically depicted in FIG. 3a, refers to the exchange (or borrowing) of employees between consortium members. In the exemplary embodiment depicted in FIG. 3a, organizations 310, 320, and 330 may each have access to portal 300, which may be configured to provide extranet access. In operation, methods for collaborative employee deployment may be consistent with the steps illustrated in the flowchart of FIG. 3b. As indicated in step 350, consortium members may publish, via the communications portal, information associated with their supply of and demand for intellectual capital. For example, organizations 310, 320, and 330 could each publish information associated with their respective supply of employees and their demand, or vacancies (e.g. projects that need staffing). In addition, step 350 may involve publishing forecasted supply and demand information, which may, as previously indicated, be based on a product lifecycle.

Figure 3B:
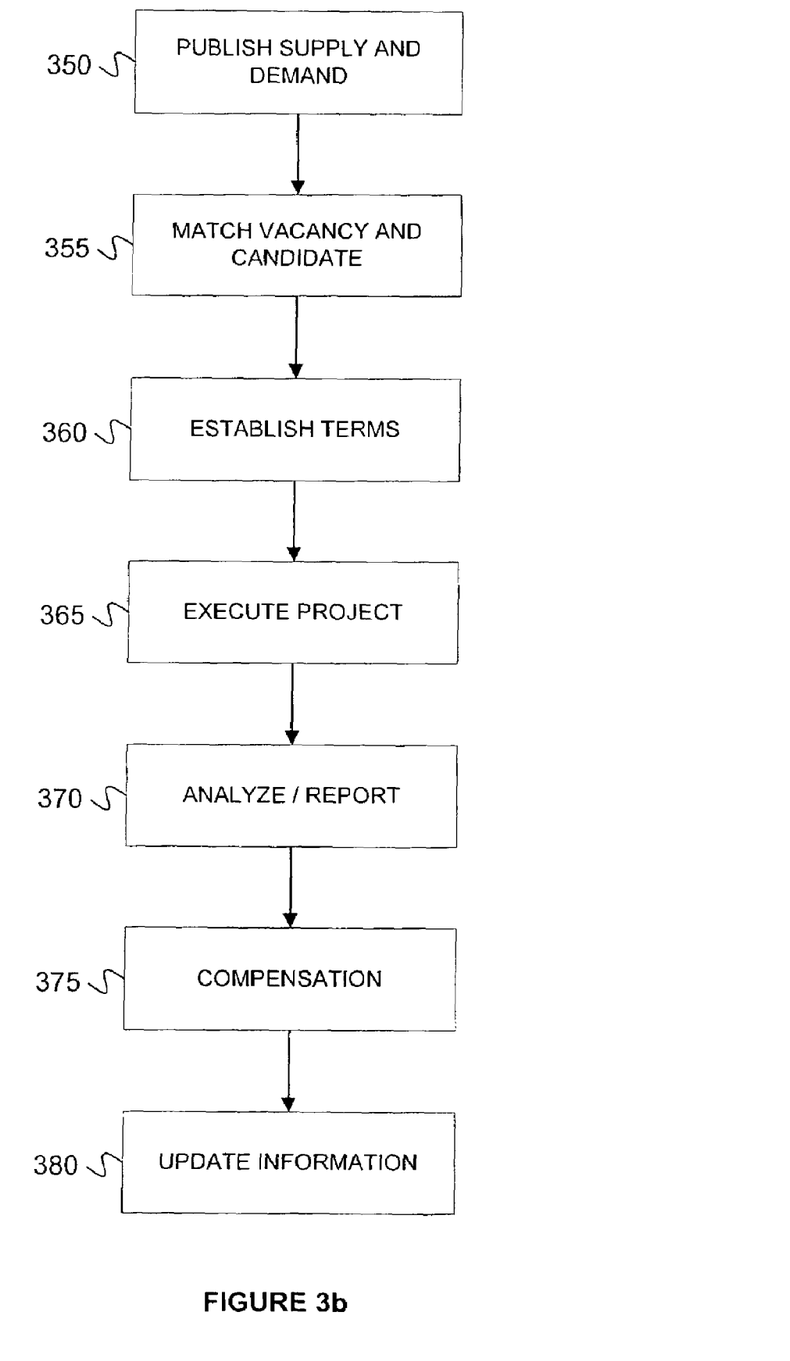

As step 355 indicates, methods may also be provided for matching or correlating employees with vacancies. This step may involve allowing a sourcing organization to search for employees from other consortium members. For example, if organization 310 has a software project which requires five developers, organization 310 (sourcing org.) could search, via the portal, for people with software development experience that are employed by organizations 320 and 330 (parent orgs). In one implementation, information associated with the employees may be stored in one or more databases and the portal may contain (or be coupled to) a search engine, which accepts a search criteria, searches the database, and returns one or more employees. The search criteria may include, but is not limited to, availability, wages, experience, education, training, peer recommendations, geographic information, previous project experience, and specific technical and/or business knowledge. Thus, organization 310 could search for five employees with software development skills that are available to work during a specific time period. Additionally or alternatively, methods may be provided for automatically finding an optimal match based on parameterized data. For example, organization 310 could request the five most optimal employees for the software development project given the requirements of the project and the search engine could select and present the appropriate employees via portal 300.

Upon correlating employees with a given vacancy, terms may be established, as indicated by step 360. For example, organization 310 (sourcing) may establish terms with organization 320 and 330 (parent organizations) for borrowing their respective employees. Step 360 may involve defining compensation amounts and schedules, length of assignments, and chains of command for employees. Once the terms are established, the vacancy or project may be executed (step 365). For example, employees from organizations 320 and 330 could travel to organization 310 to complete the software development project. Employees could also execute projects remotely from their home offices.

After a project is completed, the project may be reported and analyzed, as indicated in step 370. This step may involve invoicing and providing feedback on the borrowed employees. In one embodiment, portal 300 may contain an on-line survey which may be completed by sourcing organizations upon project completion. The survey may elicit from a sourcing organization information including, but not limited to, satisfaction with the borrowed employees, quality of employee's work, employee's work ethic, and/or a numerical rating. For example, organization 310 could provide feedback (via the survey) regarding the five employees it borrowed from organizations 320 and 330 to complete its software project. In one exemplary implementation, the feedback may be used in subsequent employee-vacancy correlations. For example, if organization 310 gives a particular employee a negative rating, that employee may be excluded from a subsequent search by organization 310. Conversely, if organization 310 gives a particular employee a favorable evaluation, that employee may be accentuated or presented first in a subsequent search. For instance, in a subsequent search for employees, portal 300 may display prospective employees along with a feedback indicator (numerical score, symbol, etc.) for each, indicating prior experience. In one example, the feedback rating may be a number representing the amount of favorable and negative ratings provided by one or more sourcing organizations. Thus, a sourcing organization may be able to quickly identify preferred employees.

As step 375 indicates, compensation may occur after project completion. This step may involve, for example, sourcing organization 310 paying the borrowed employees directly, or indirectly by way of their respective parent organization(s). This step may also involve paying employees bonuses from the parent and/or sourcing organization(s).

As indicated in step 380, portal 300 and/or the database(s) may be updated to reflect project completion and employee experience. This step may also involve updating supply of and demand for intellectual capital. That is, organizations may be able to publish additional employees, remove existing employees, publish new projects, and remove completed projects.

The steps illustrated in the flowchart of FIG. 3b are consistent with one exemplary implementation of the instant invention. It should, therefore, be understood that other method steps may be used, and even with the method depicted in FIG. 3b, the particular order of events may vary without departing from the scope of the present invention. Further, certain steps may not be present, additional steps may be added, and the order of the steps may be modified without departing from the scope and spirit of the invention, as claimed.

Figure 4:
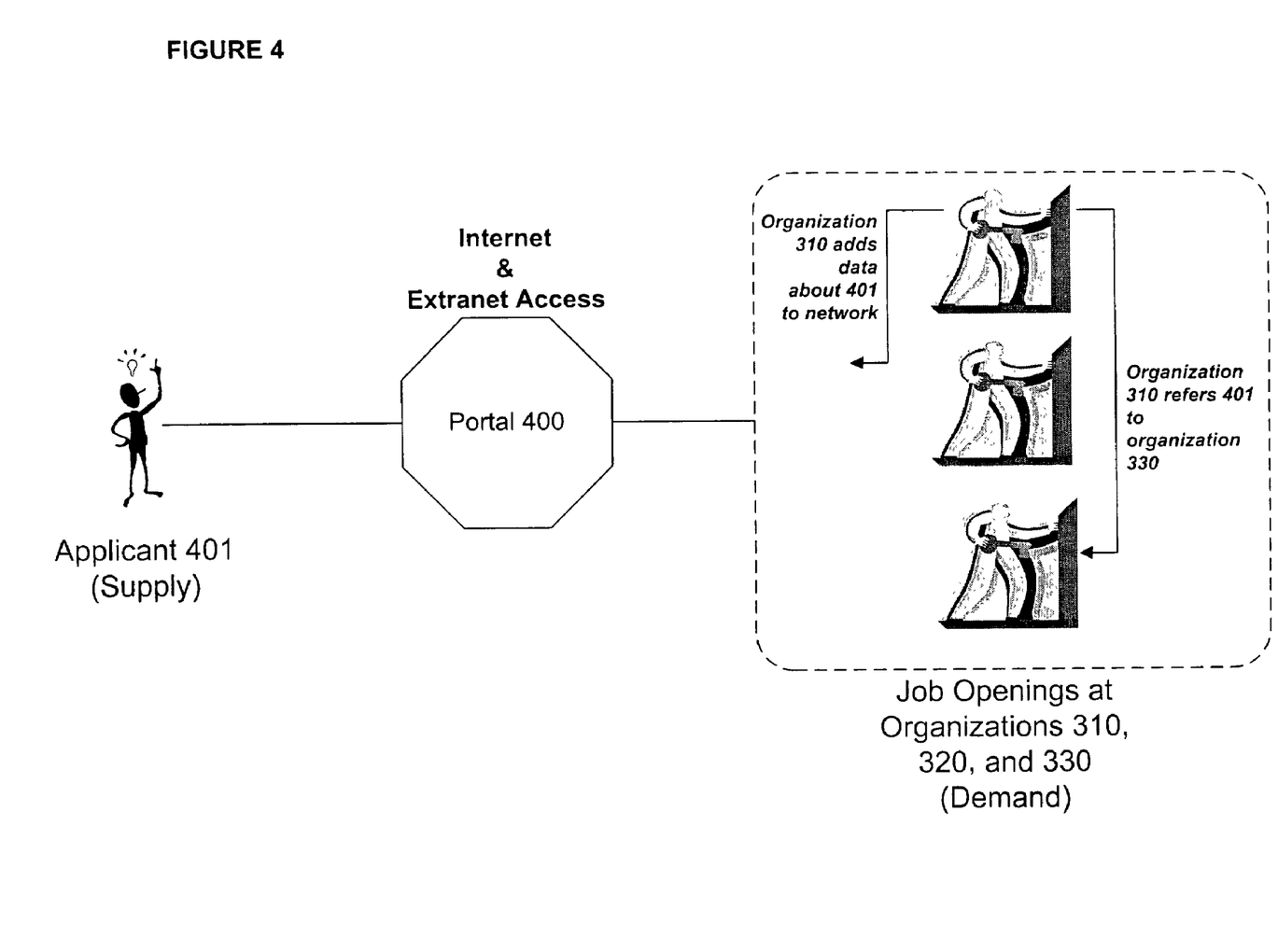
FIG. 4 is an exemplary block diagram depicting another implementation of the present invention.

As previously indicated, human capital management may additionally or alternatively include "collaborative employee hiring," which is graphically depicted in FIG. 4. This form of human capital management may involve referring applicants among consortium members. Collaborative employee hiring may broaden the effective applicant pool, thereby allowing consortium members to attract a higher percentage of qualified applicants. Methods for enabling collaborative employee hiring may involve providing a hiring portal 400, which provides internet and extranet access. That is, consortium members as well as applicants from the general public may have access to hiring portal 400. In one embodiment, the internet access may be more limited to the extranet access. Thus, applicants may be restricted from certain areas of hiring portal 400. In one configuration, hiring portal 400 may be configured to identify the consortium members and may communicate to applicants that their information may be shared among the consortium members As illustrated in FIG. 4, consortium members (310, 320, and 330) may publish their respective demand for applicants by way of publishing one or more job openings via hiring portal 400. In one embodiment, applicants may register via hiring portal 400 to access and apply for these job openings. In alternative embodiments, access to job openings may be provided to the general public.

As illustrated, applicant 401 may apply for a job opening published by organization 310. In exemplary embodiments, hiring portal 400 may allow applicant 401 to search published job openings based on a search criteria. Thus an applicant may, for example, be able to search job openings based on geographic location, pay, title or position, term of employment, and field. Applying for a job may involve completing an electronic resume via hiring portal 400 and/or emailing or mailing a resume to an organization. Applying may also involve answering questions and/or completing an on-line employment application.

As FIG. 4 indicates, upon receiving an application from applicant 401, and optionally requesting additional information from the applicant, organization 310 may refer applicant 401 to organization 330. This referral may be based on information published in the communications portal not accessible to applicant 401, such as workforce deficiencies (demand) published by organization 330.

Figure 5:
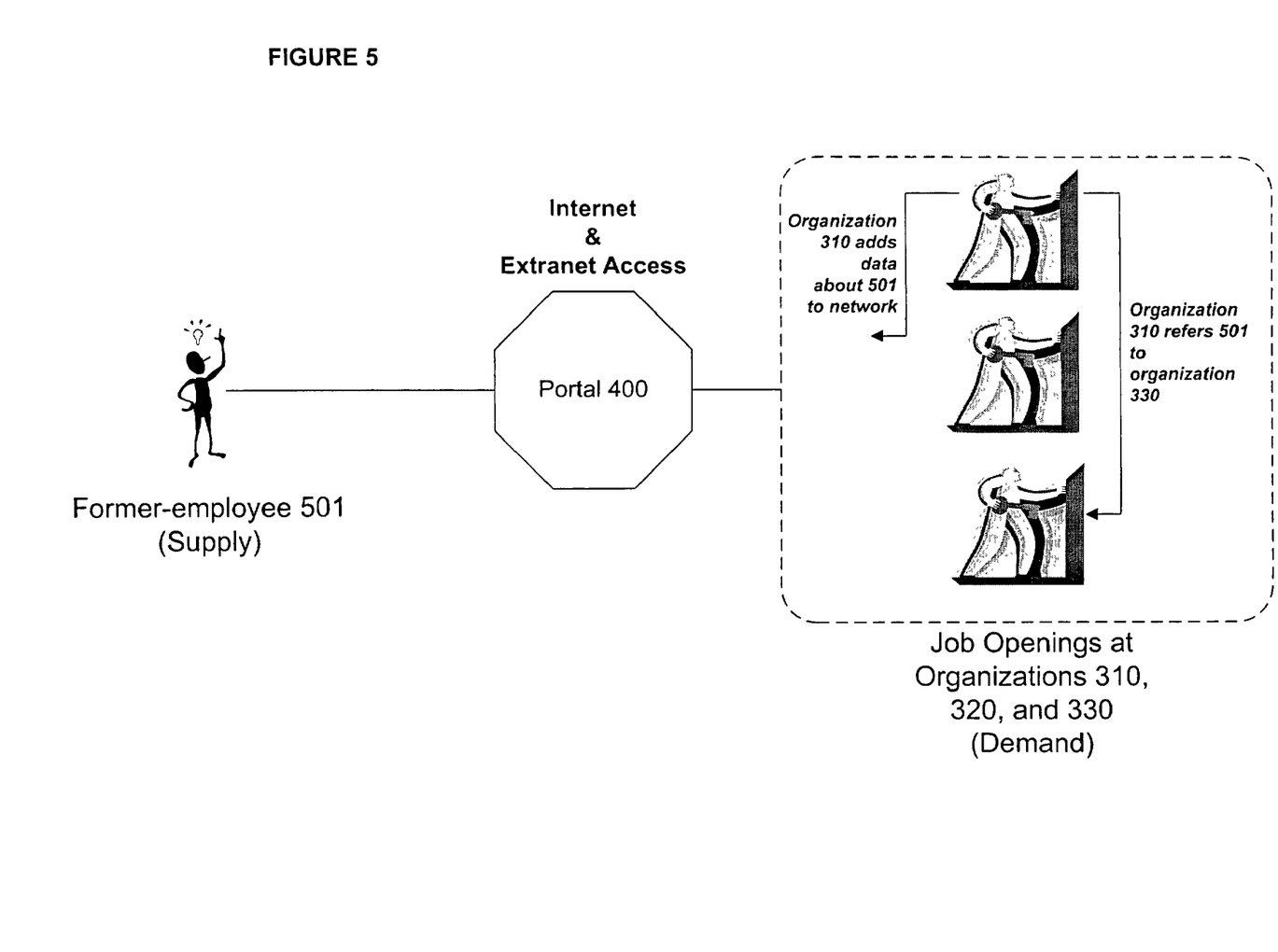
FIG. 5 is an exemplary block diagram depicting an additional aspect of the present invention.

Human capital management may additionally or alternatively include "collaborative employee rehiring," which is graphically depicted in FIG. 5. This form of human capital management may enable a former employee, or alumni, to apply for jobs with a given consortium given that the employee has a prior affiliation with at least one consortium member. Consortium members may share information about recent alumni to prevent employees from defecting to the competition.

In one embodiment, collaborative employee rehiring may be consistent with collaborative employee hiring, as described above in connection with FIG. 4. However, in certain implementations, alumni may be automatically registered to apply for jobs and/or may be given greater access to information within the communications portal. In addition, there may be a less stringent application process used with alumni in comparison to new applicants.

Figure 6:
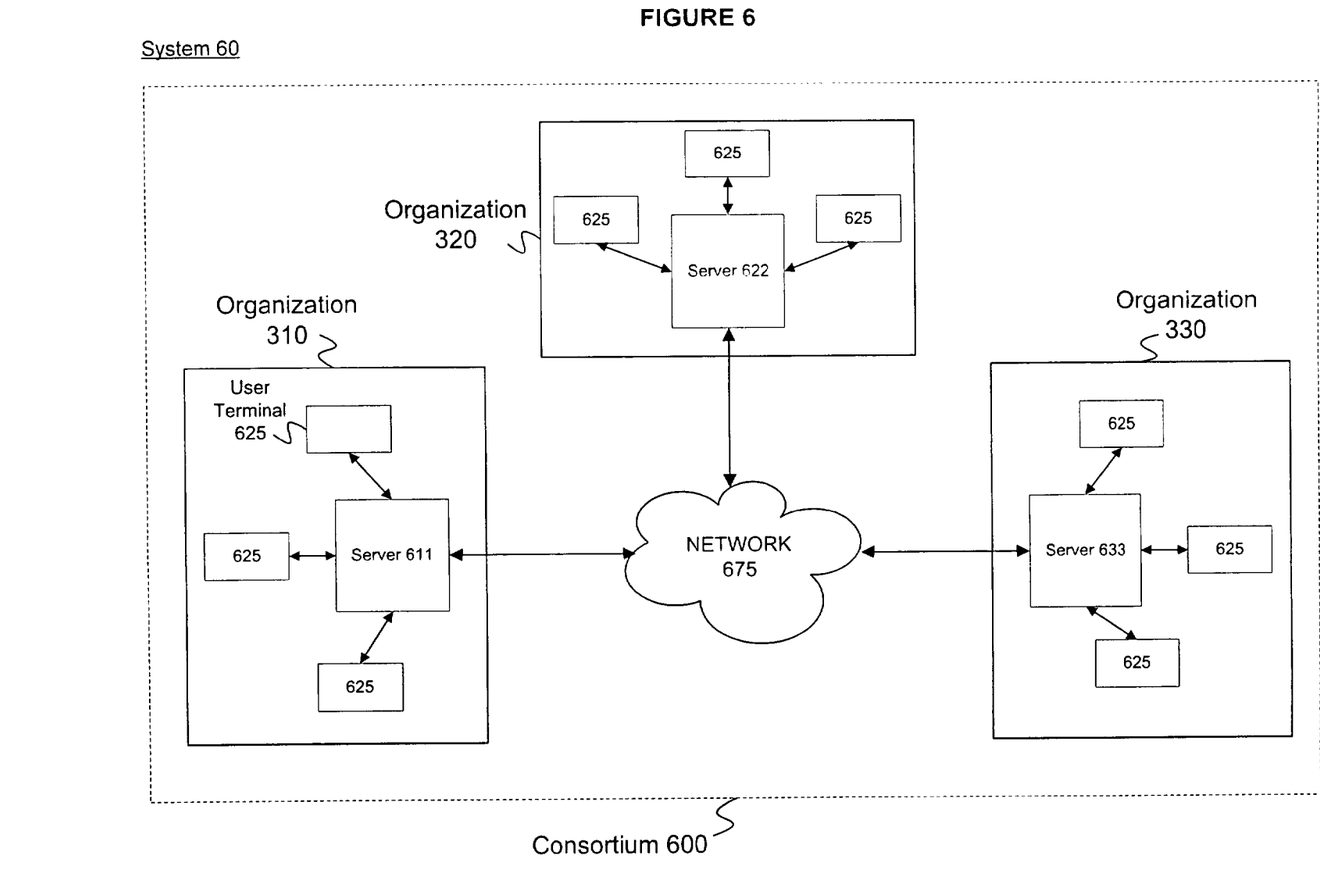
FIG. 6 is an exemplary block diagram of a system in which the present invention may be practiced.

Methods consistent with an exemplary implementation of the present invention may be practiced in system 60 of FIG. 6. System 60 may comprise a consortium 600, which is further comprised of organizations 310, 320, and 330. As illustrated, organizations 310, 320 and 330 may include servers 611, 622, and 633, respectively. In addition each organization may include at least one user terminal (625). Although three organizations are illustrated, any number of geographically dispersed organizations may be included in consortium 600. Likewise, any number of servers and user terminals may exist within consortium 600. In addition, consortium 600 may be scalable. That is, organizations may be dynamically added and/or removed from consortium 600. Moreover, a skilled artisan will realize that a plurality of consortiums could be included in system 60.

Organizations 310, 320, and 330 may be interconnected via, or included in, network 675. Network 675 may be the Internet, a virtual private network, a broadband digital network or any other structure for enabling communication between two or more nodes or locations. Network 675 may include one or more wired and/or wireless connections. Network 675 may employ communication protocols such as Transmission Control and Internet Protocol (TCP/IP), Asynchronous Transfer Mode (ATM), Ethernet, or any other compilation of procedures for controlling communications among network locations. Servers 611, 622, and 633 and the user terminals (625) may be operatively connected to network 675 by communication devices and software known in the art, such as those commonly employed by Internet Service Providers (ISPs) or as part of an Internet gateway. Servers 611, 622, and 633 and the user terminals may also be assigned network identifiers (ID). The ID's may, in one configuration, be encoded as IP addresses. However, the ID's may be any symbol, value, tag, or identifier used for addressing, identifying, relating, or referencing a particular network device.

Figure 7:
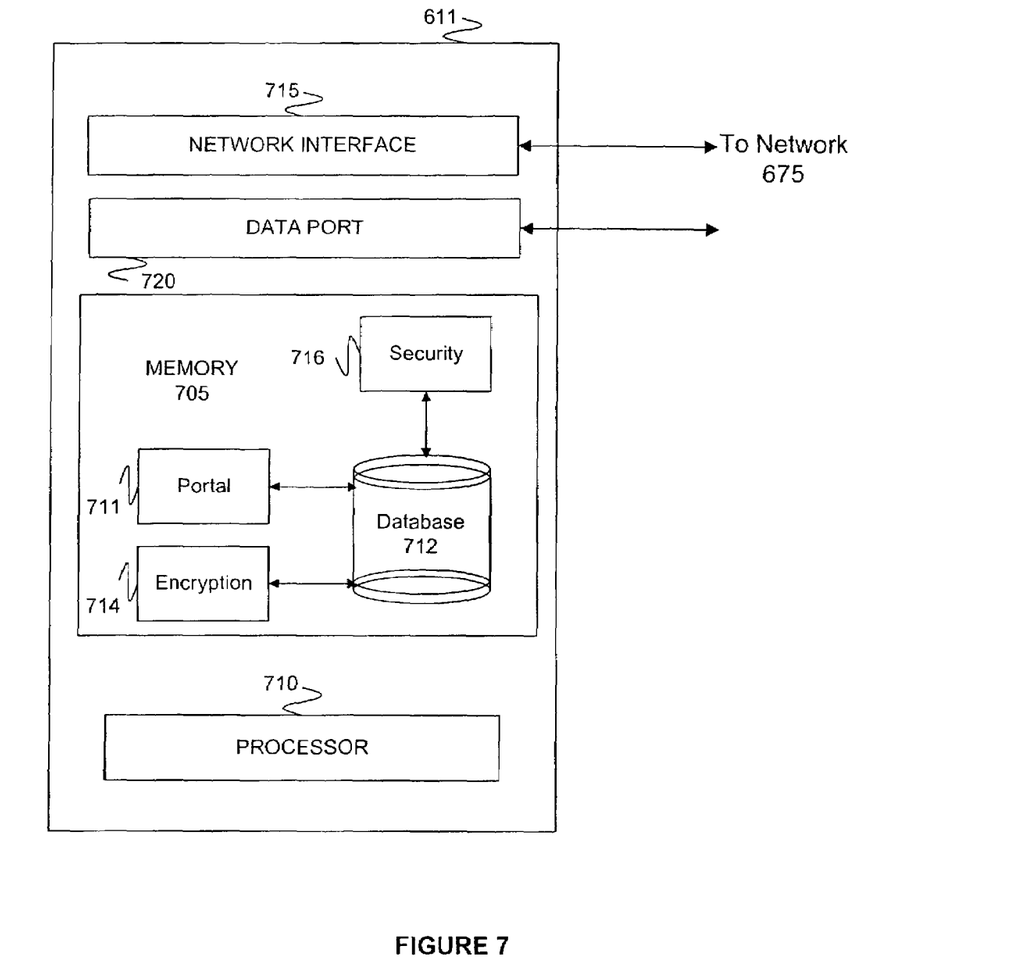
FIG. 7 is an exemplary block diagram of a server that is depicted in the system of FIG. 6.

FIG. 7 illustrates one particular combination of components that could be included in server 611. As illustrated, server 611 may comprise a memory device 705; a processor 710; a network interface 715; and a data port 720. In one configuration, one or more of the components residing in server 611 may be scalable in order to accommodate additional services, data, clients, and/or consortium members.

Memory device 705 may be any mechanism capable of storing information including, but not limited to, RAM, ROM, magnetic and optical storage, organic storage, audio disks, and video disks. Although a single memory device is shown, any number of memory devices may be included in server 611, and each may be configured for performing distinct functions.

As illustrated in FIG. 7, memory device 705 may further comprise portal 711, database 712, encryption software 714, and security mechanism 716. Database 712 may be a relational database, distributed database, object-oriented programming database, or any other mechanism for accessing, managing, and updating an aggregation of data. In one configuration, database 712 may contain organization 310's supply and demand information. For the sake of brevity, FIG. 7 depicts a single database residing in server 611. However, it should be understood that a plurality of databases may exist in server 611. In addition, database 712 may reside external to server 611 and may be coupled to the server(s) and/or user terminal(s) via network 675.

Portal 711 may be coupled to database 712 and may provide access to information contained in database 712. Portal 711 may be one or more websites providing extranet, intranet, and/or internet access for consortium 600. As previously explained, portal 711 may provide features including but not limited to data access, categorization, personalization options, data profiling, and application integration. In addition, portal 711 may contain or be coupled to a search engine for performing data searches and correlations.

Encryption software 714 may be used to secure data maintained in database 712 and data published and/or transmitted via portal 711. Security mechanism 716 may be responsible for authentication and/or authorization processes.

For clarity of explanation, portal 711, encryption software 714, and security mechanism 716 are described as discrete functional elements. However, it should be understood that the functionality of these elements may overlap and/or may exist in a single package. Moreover, all or part of the functionality of these elements may co-exist or be distributed among several servers and/or user terminals. In addition, it should be understood that portal 711 may be maintained by a single consortium member (while provided to the entire consortium), or may be distributed among one or more of the consortium members. For example, each consortium member could maintain a separate and personalized portal, each of which are coupled via network 675 and configured to interact.

In one configuration, server 611 may include processor 710, which is operatively configured to execute program instructions. Processors 710 may be configured for routing information among components and devices and for executing computer instructions received from portal 711, encryption software 714, and security mechanism 716.

Server 611 may be connected to network 675 via network interface 715 which may be operatively connected via a wired and/or wireless communications link. Network interface 715 may be any mechanism for sending information to and receiving information from network 675, such as a network card and an Ethernet port, or to any other network such as an attached Ethernet LAN, serial line, etc. As illustrated, server 611 may additionally comprise a data port 720 for transmitting data serially or in parallel.

A skilled artisan will realize that servers 622 and 633 may be similar in structure to server 611. However, in certain implementations, server 622 and 633 may lack certain elements contained in server 611 or contain additional or varying elements.

Figure 8:
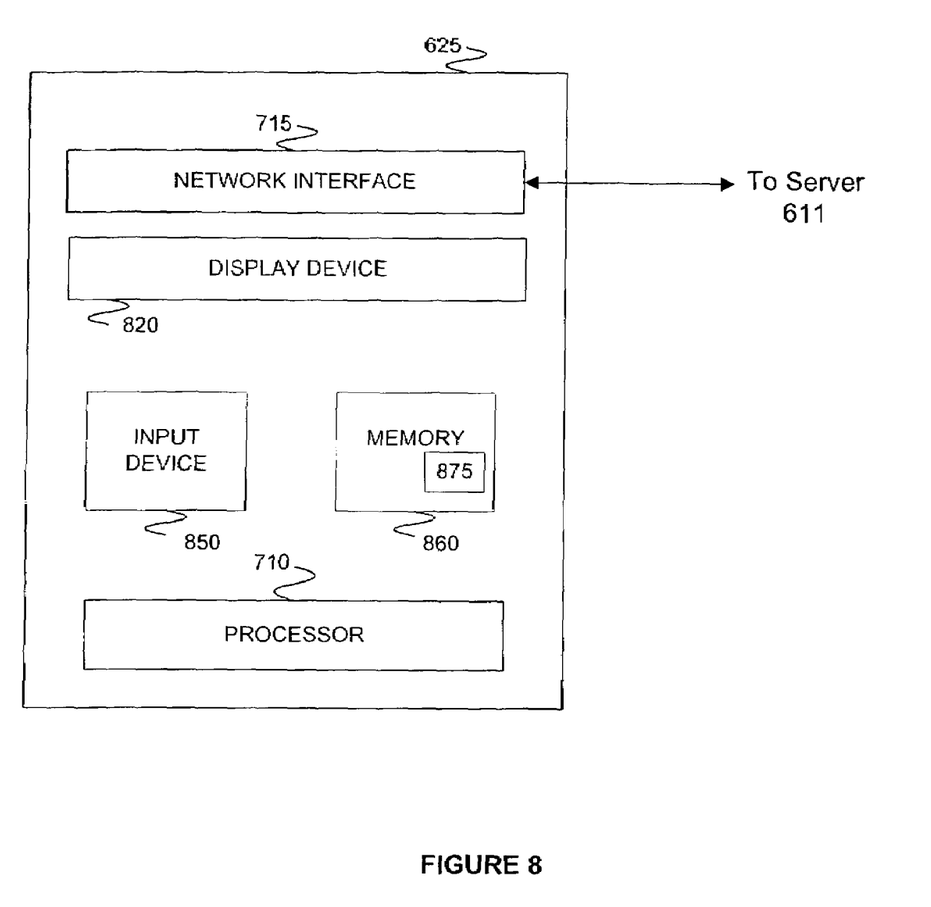
FIG. 8 is an exemplary block diagram of a user terminal that is depicted in the system of FIG. 6.

In one configuration, user terminal 625 may include components similar to those described in connection with server 611, such as network interface 715, and processor 710 (e.g., CPU 120). However, user terminal 625 may be structurally different from server 611 and may have varying or additional components. User terminal 625 may be a personal computer, mobile computing device (e.g., a PDA), mobile communications device (e.g., a cell phone), or any other structure that enables a user to remotely access information. In alternative embodiments, user terminal 625 could be a kiosk or "dumb" terminal coupled to server 611. In one exemplary implementation, user terminal 625 may comprise a display device 820, an input device 850, and a memory 860.

As illustrated, user terminal 625 may comprise memory 860, which may be of similar structure to memory device 705 in server 611. However, in certain configurations, memory 860 may have less storage capacity than memory device 705 in order to reduce cost and size.

As illustrated, memory 860 may further comprise encryption software 875. Encryption software 875 may, for example, allow the terminal to decrypt and access encrypted data from server 611.

In addition, client 625 may include display device 820, which may be configured to output text, images, or any other type of information by way of a cathode ray tube, liquid crystal, light-emitting diode, gas plasma, or other type of display mechanism. For example, display device 820 may be a computer monitor such as monitor 130. Display device 820 may be used in conjunction with input device 850 for allowing user interaction.

Input device 850 may include at least one button actuated by the user to input commands and thereby select from a plurality of processor operating modes. Input device 850 may include components such as keyboard 110, a mouse, and/or a touch screen. Input device 850 may additionally or alternatively include a data reading device and/or an input port.

It should be understood that processes described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

It will be apparent to those skilled in the art that various modifications and variations can be made in the systems and methods of the present invention as well as in the construction of this invention without departing from the scope of or spirit of the invention.

The present invention has been described in relation to a particular example which is intended in all respects to be illustrative rather than restrictive. Those skilled in the art will appreciate that many different combinations of hardware, software, and firmware will be suitable for practicing the present invention.

Moreover, other implementations of the invention will be apparent to those skilled in the art from consideration of the specification and practice of the invention disclosed herein. It is intended that the specification and examples be considered as exemplary only. To this end, it is to be understood that inventive aspects lie in less than all features of a single foregoing disclosed implementation or configuration. Thus, the true scope and spirit of the invention is indicated by the following claims.

What is claimed is:

1. A method for exchanging intellectual capital comprising the steps of:
   establishing a consortium comprising a first organization and at least a second organization;
   establishing rules for governing the consortium;
   providing a communications interface to the consortium through which the first organization can publish information associated with its intellectual capabilities;
   allowing the second organization to access the published information via the communications interface;
   allowing the second organization to utilize the first organization's intellectual capabilities, by allowing the second organization to utilize at least one employee of the first organization while the employee continues to be employed by the first organization;
   allowing the second organization to publish information associated with its intellectual capabilities through the communications interface;
   allowing the first organization to access the published information via the communications interface; and
   allowing the first organization to utilize the second organization's intellectual capabilities, by allowing the first organization to utilize at least one employee of the second organization while the employee continues to be employed by the second organization.

2. The method of claim 1, wherein providing a communications interface involves creating at least one of an internet website, an extranet website, and an intranet website.

3. The method of claim 1, wherein allowing the second organization to access the published information involves authenticating the second organization.

4. The method of claim 1, wherein establishing rules for governing the consortium involves establishing at least one of a non-compete clause, user access privileges, a confidentiality agreement, a dispute clause, a business objective, and a consortium administrator.

5. The method of claim 1, wherein allowing the second organization to utilize the first organization's intellectual capabilities involves allowing the second organization to utilize at least one application for employment received by the first organization.

6. The method of claim 1, wherein allowing the second organization to utilize the first organization's intellectual capabilities involves allowing the second organization to utilize at least one person formerly employed by the first organization.

7. The method of claim 1, further comprising the step of providing a subset of members of the first organization and a subset of members of the second organization with passwords which allow the members to access the communications interface.

8. The method of claim 1, wherein the first and second organizations are business alliances.

9. A method for exchanging employees comprising the steps of:
   establishing a consortium comprising a first organization and at least a second organization;
   establishing rules for governing the consortium;
   providing a communications portal to the consortium through which the first organization can publish information associated with at least one of its employees;
   enabling the second organization to access, via the portal, the information associated with the first organization's employees;
   correlating the first organization's employee with a requirement of the second organization;

enabling the second organization to utilize the first organization's employee while the employee continues to be employed by the first organization;

enabling the first organization to access, via the portal, the information associated with the second organization's employees;

correlating the second organization's employee with a requirement of the first organization; and enabling the first organization to utilize the second organization's employee while the employee continues to be employed by the first organization.

10. The method of claim 9, wherein providing a communications portal involves creating at least one of an internet website, an extranet website, and an intranet website.

11. The method of claim 9, wherein establishing rules for governing interaction within the consortium involves establishing at least one of a non-compete clause, an employee conduct regulation, a business objective, a confidentiality agreement, a dispute clause, and a consortium administrator.

12. The method of claim 9, wherein publishing, by the first organization, information associated with at least one of its employees involves publishing information relating to at least one of prior work experience, education, training, availability, wages, and demographics.

13. The method of claim 9, wherein enabling the second organization to access the information associated with the first organization's employees involves authenticating the second organization.

14. The method of claim 12, wherein enabling the second organization to access the information associated with the first organization's employees involves enabling the second organization to search the first organization's employees based on prior work experience, education, training, availability, wages, and demographics.

15. The method of claim 9, further comprising the step of providing a subset of members of the first organization and a subset of members of the second organization with passwords which allow the members to access the portal.

16. The method of claim 9 further comprising the step of automatically finding at least one of the first organization's employees that will be suitable for use by the second organization.

17. The method of claim 9 further comprising the steps of:
enabling the second organization to provide feedback on the first organization's employee after utilizing the first employee, and
using the feedback in a subsequent search, by the second organization, for an employee.

18. The method of claim 17, wherein enabling the second organization to provide feedback involves providing an on-line survey via the communications portal.

19. The method of claim 9 further comprising the step enabling the first organization to update the published information associated with its employees to reflect that said employees were utilized by the second organization.

20. A system for exchanging intellectual capital comprising:
a first organization coupled to a network having a plurality of employees and a demand for at least one employee;
at least a second organization coupled to the network having a plurality of employees and a demand for at least one employee;
a storage device for storing information associated with the first and second organization's employees;
a portal through which the first organization can publish information associated with its employees and its demand and the second organization can publish information associated with its employees and its demand; and
a correlation mechanism coupled to the portal for searching the storage mechanism and presenting to the second organization at least one of the first organization's employees that is able to fulfill the second organization's demand and for presenting to the first organization at least one of the second organization's employees that is able to fulfill the first organization's demand.

21. The system of claim 20, wherein the storage device is a database.

22. The system of claim 20, wherein the portal is at least one of an internet website, an intranet website, and an extranet website.

23. The system of claim 20, wherein the correlation mechanism receives a search criteria from the second organization and presents the first organization's employee to the second organization based on the search criteria.

24. The system of claim 20, wherein the search criteria includes at least one of prior work experience, education, training, availability, wages, and demographics.

25. The system of claim 20, wherein the first and second organization are coupled to the network via one or more servers and wherein the portal is maintained on said servers.

26. A computer-readable medium containing instructions for controlling a computer system coupled to a network to perform a method, the computer system having a display device, an input device, and a processor for executing the instructions, the method comprising the steps of:
presenting, via the display device, a communications portal through which a first organization can access information associated with a plurality of employees of at least a second organization and the second organization can access information associated with a plurality of employees of at least the first organization;
receiving at least one command from the first organization to search the information associated with the plurality of employees of the second organization;
receiving at least one command from the second organization to search the information associated with the plurality of employees of the first organization;
correlating at least one of the plurality of employees of the second organization with a requirement of the first organization;
correlating at least one of the plurality of employees of the first organization with a requirement of the second organization;
allowing the second organization to utilize the first organization's intellectual capabilities, by allowing the second organization to utilize at least one employee of the first organization while the employee continues to be employed by the first organization; and
allowing the first organization to utilize the second organization's intellectual capabilities, by allowing the first organization to utilize at least one employee of the second organization while the employee continues to be employed by the second organization.

* * * * *